June 6, 1950          M. DRAGO          2,510,309
MECHANICAL FISH

Filed July 26, 1946          4 Sheets-Sheet 1

INVENTOR.
MICHAEL DRAGO
BY
ATTORNEYS

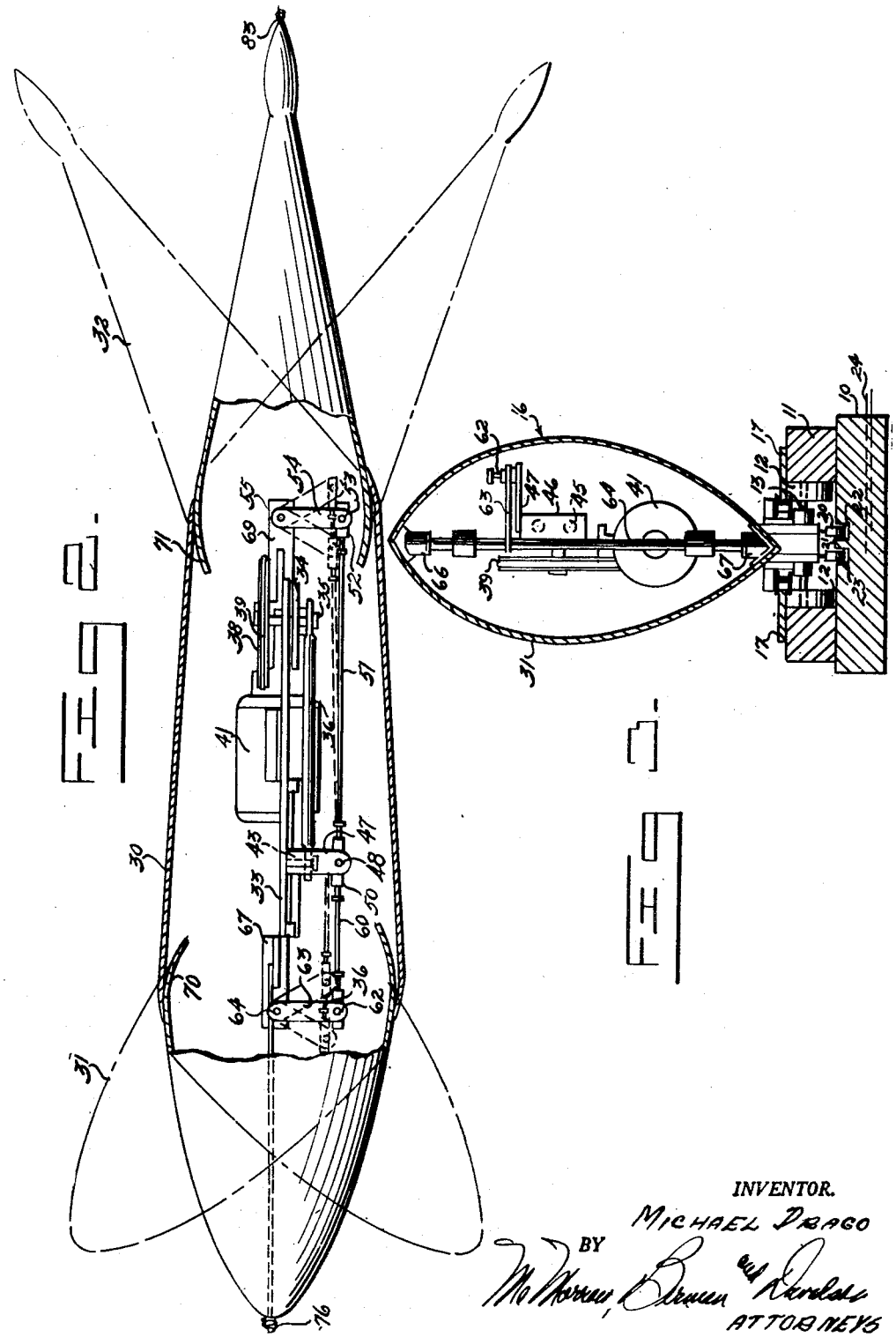

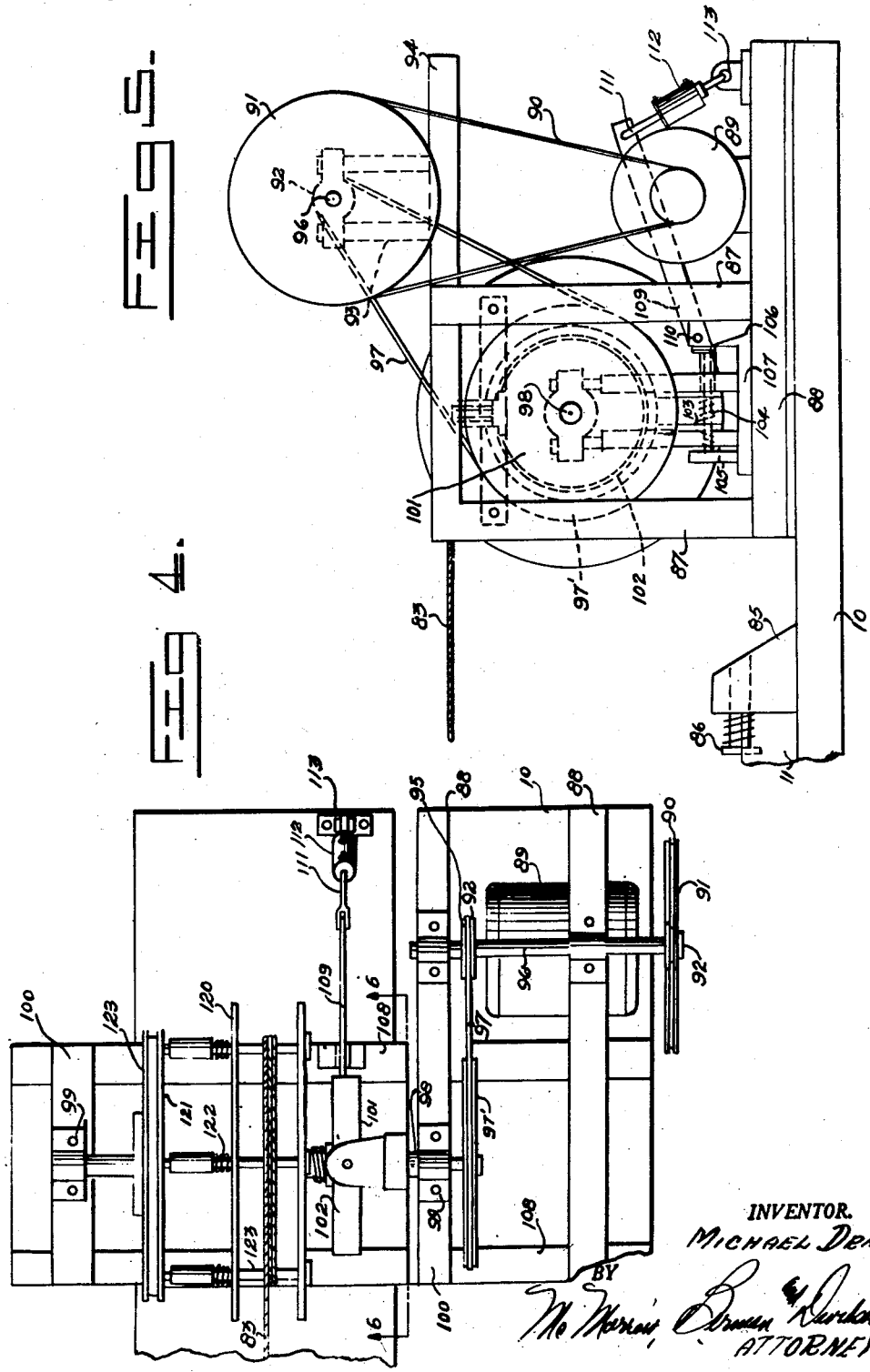

June 6, 1950 M. DRAGO 2,510,309
MECHANICAL FISH
Filed July 26, 1946 4 Sheets-Sheet 4
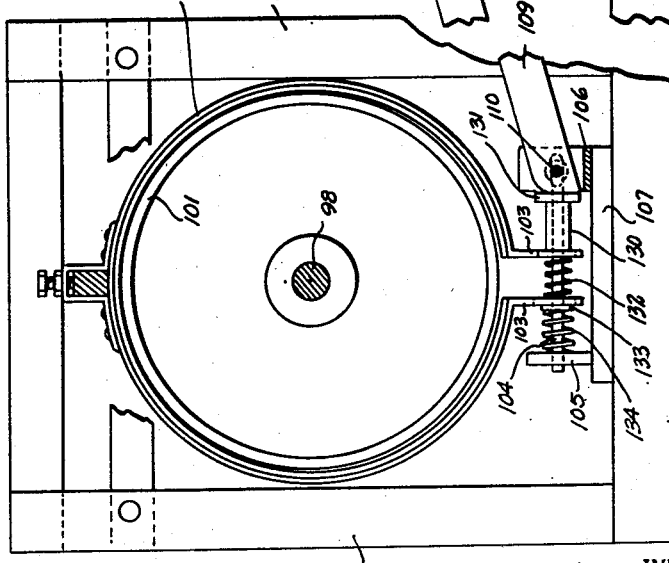
INVENTOR.
MICHAEL DRAGO,
BY
McMorrow, Berman & Davidson
ATTORNEYS.

Patented June 6, 1950

2,510,309

UNITED STATES PATENT OFFICE 2,510,309

MECHANICAL FISH

Michael Drago, Hempstead, N. Y.

Application July 26, 1946, Serial No. 686,302

3 Claims. (Cl. 46—92)

1

This invention relates to a mechanical fish, and more particularly to such a fish in simulation of a tuna fish, or the like, adapted to be mounted on trackways, and provided with means for simulating the resistance afforded by actual fish, as well as certain of the movements thereof when played by an angler.

A primary object of this invention is the provision of an improved simulated fish characterized by means whereby the effect of landing a relatively large fish is effectively simulated to an angler who has hooked the fish.

A further object of the invention is the provision of such a device provided with means whereby the resistance of the fish may be controlled both automatically and manually, in order to afford a resistance analogous to that afforded by a correspondingly sized live fish.

A further object of the invention is the provision of such a device which provides a relatively high entertainment and amusement value.

Still other objects reside in the combinations of elements, arrangements of parts, and features of construction, all as will be more fully pointed out hereinafter and shown in the accompanying drawings, wherein there is disclosed a preferred embodiment of this inventive concept.

In the drawings:

Figure 2 is a top view partially in elevation and partially in section of the fish disclosed in Figure 1, certain alternative positions of adjustment thereof being indicated by dotted lines.

Figure 3 is a sectional view taken substantially along the line 3—3 of Figure 1, as indicated by the arrows.

Figure 4 is a top plan view of a portion of the motor mechanism adapted to be attached to the tail of the fish to retard the movement thereof toward the angler.

Figure 5 is a side elevational view of the apparatus shown in Figure 1, concealed portions thereof being indicated in dotted lines.

Figure 6 is a sectional view taken on the line 6—6 of Figure 4.

Figure 7 is a sectional view taken on the line 7—7 of Figure 6.

Similar reference characters refer to similar parts throughout the several views of the drawings.

2

Figure 1:
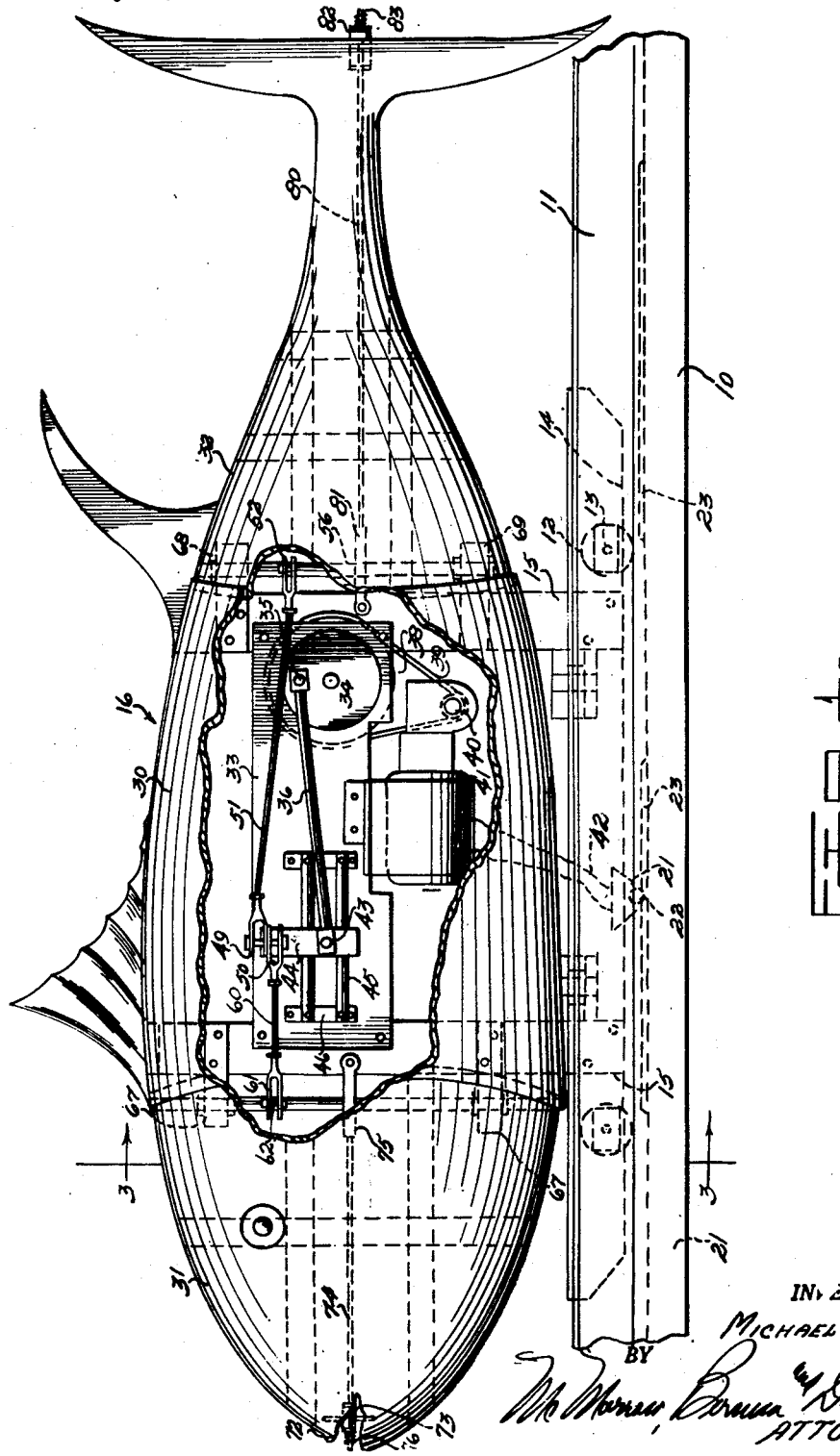
Figure 1 is a side view partially in elevation and partially in section, certain concealed parts thereof being indicated in dotted lines, of one form of fish embodying features of the instant invention disclosing a portion of the track upon which the fish is adapted to travel.

Referring now to the drawings, the device of the instant invention comprises a base plate generally indicated at 10, forming the base of a trackway. As best shown in Figures 1 and 3, the base plate 10 is provided with side plates 11, which serve as guides for wheels 12 mounted on an axle 13, carried in a depending body portion 14 mounted on posts 15, which support the body of a simulated fish generally indicated at 16, and to be more fully described hereinafter. As best shown in Figure 3, side plates 17 overlie the side blocks 11, and serve to support the fish in upright position.

A depending shoe 20 extends into channels 21 in the center of the base plate 10, and carries contact rollers 22 which are adapted to engage contact strips 23 at suitable spaced intervals during the travel of the fish 16. Current is supplied to the contact strips 23, as by means of wires 24.

Referring now to the body of the fish 16, the same is comprised of a body portion 30, a head portion 31, and a tail portion 32.

Mounted in the central body portion between the supporting posts 15 is a longitudinally extending plate member 33, upon one side of which is journaled a pulley 34 provided with an off-center pin 35, to which is secured one end of a pitman 36.

The axle 37 of the pulley 34 carries, on the opposite side of the plate member 33 a pulley 38, driven by a belt 39, which is in turn driven by a pulley 40 operated through any desired conventional gear system by the drive shaft of an electric motor 41. The motor 41 is connected by suitable wires 42 to the contact rollers 22, and is adapted to be energized when the previously mentioned contact strips 23 are engaged by the rollers.

The opposite end of pitman 36 is pivotally mounted, as on a pivot 43, on a sliding member 44 carried by rods 45 supported on brackets 46 carried by the frame plate 33. The upper end of the member 44 carries an offset projection 47 to which are pivotally linked, as by a pivot pin 48, two brackets 49 and 50, respectively. The bracket 49 engages a rod 51, which in turn terminates in a bracket 52, which engages a pin 53 carried by an arm 54, the opposite end of the arm 54 being pivotally secured, as at 55, to the upper extremity of a vertical shaft 56 extending through the tail section 32 of the fish.

Correspondingly, the bracket 50 engages a rod 60, the opposite end of which carries a bracket 61, which is engaged by a pin 62, secured to an arm 63, which in turn is pivotally mounted on a shaft 64, which extends vertically through the front section of the fish.

Now, from the foregoing, it will be seen that as the motor is energized and the eccentric formed by the pulley 34 and its offset pin 35 is energized, the head and tail sections 31 and 32 are caused to reciprocate from right to left, as indicated in dotted lines in Figure 2, the speed of the movement being governed by the relative speed of the motor, in simulation of the actual shaking movements of a large fish in trying to dislodge the hook from its mouth.

As best shown in Figure 1, the shafts 64 and 56, respectively, are journaled in upper and lower blocks 66 and 67, and 68 and 69, respectively, set in the body portion of the fish. The front and rear portions 31 and 32 are provided with inwardly turned extremities 70 and 71, respectively, in such manner that when the head and tail sections are turned, there is no apparent break in the body section.

The mouth 72 of the fish has secured therein a plug 73, from which a line 74 extends rearwardly to a bracket or bifurcated member 75 secured to the foremost of the vertical post members 15.

From the opposite end of the plug 73, a line 76 extends forwardly of the fish to suitable tackle, or the like, by means of which the angler endeavors to pull the fish along the trackway formed by the members 10 and 11 to such position that the fish can be normally reeled in and gaffed, despite the motions of the head and tail portions previously described.

Means are also provided to resist such reeling motion, and take the form of a line or cable 80 which extends from a bracket 81 secured to the rearmost of the vertical uprights 15 to a plug 82, from which a line 83 extends from the tail of the fish to a suitable motor mechanism adapted to retard the reeling end of the fish.

Such mechanism is best shown in Figures 4, 5, 6 and 7. The rear end of the trackway 10 includes a bumper block 85, provided with spring-biased bumpers 86 of any desired conventional design between the side members 11, and adapted to engage the rear end of the body portion 14 when the fish is in completely retracted position towards the motor block. Base 10 rearwardly of the bumper 85 carries upright members 87, mounted on a supporting base 88, which carries a motor 89. The motor 89 drives through a belt 90 a pulley 91 journaled in suitable journals 92 carried by uprights 93 which in turn are supported on transverse members 94 carried by the uprights 87. A pulley 95 on the opposite side of the axle 96 which supports the pulley 91 drives through a belt 97 a pulley 97', mounted on an axle 98 journaled in suitable supporting brackets 99 in horizontally extending members 100 also supported by the uprights 87.

The axle 98 extends through a brake drum 101 surrounded by a brake band 102. The band 102 has spaced depending ears 103 on the lower side thereof which ears are connected by a pin 104 set in guides 105 and 106, respectively, carried by a base plate 107 in turn carried by the supporting base 88. One end of the pin 104 is pivotally connected, as by a pin and slot connection indicated by 110, to a lever 109. As shown in Figure 6, the portion of the pin 104 intermediate the guide 106 and the ear 103 adjacent thereto is surrounded by a bushing 130 having a collar 131. Circumposed upon the pin 104 intermediate the ears 103 is a coiled spring 132. Also, circumposed upon the pin 104 intermediate a collar 133 fixedly carried by said pin and the guide 105 is a coiled spring 134. The other end of the lever 109 is linked to the piston rod 111 of a hydraulic cylinder 112, the opposite end of which is anchored in a lug 113 carried by the supporting frame. The cylinder is provided with ports 135 and 136 for controlling the actuation of the piston in said hydraulic cylinder.

Thus, it will be seen that the hydraulic cylinder 112 may be controlled in any desired external manner, in such way as to afford a positive lock, or a degree of braking force exerted on the drum 101 to afford a desired pull against the strength of the angler.

Rotatably mounted on the axle 98, Figure 7, and directly connected to the drum 101 is a reel 120 on which the line 83 is wound. Loosely mounted on the axle 98 and operatively connected to the reel 120 by means of a plurality of spring actuable pin devices 122 is a friction disc clutch member 121. The disc clutch member 121 is in frictional engagement with a friction disc clutch member 123 which is keyed on the axle 98. It is to be noted that the spring pin devices 122 act to maintain the respective faces of the disc clutch members 121 and 123 in equalized contact throughout their entire area. This mounting of the disc clutch members provides a constant drag on the drum 101 regardless of the condition of the brake band 102.

From the foregoing the operation of the device should now be readily understandable. It will be seen that when the line 76 is attached suitably to any desired fishing gear, for entertainment value, for testing the gear, or the like, and pressure is exerted on the gear, that corresponding drag is effected by the reel, its friction discs above described, and the associated brake mechanism as desired. It will correspondingly be seen that motion may be imparted to the head and tail sections of the fish in the manner previously described in such manner as to simulate the shaking of the hook from the fish's mouth.

It will now be seen that there is herein provided an improved instructional and amusement device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A device to simulate catching a live fish comprising a relatively stationary track, a fish simulating member mounted upon the track for longitudinal movement therealong, means connected with the track and engaging the member to prevent its upward movement with respect to the track while permitting it to move longitudinally of the track, a flexible element connected with one end of the fish simulating member for pulling it along the track, a second flexible element connected with the opposite end of the fish simulating member, a winding reel connected with the track and spaced from the fish simulating member and adapted to have the second flexible element wound thereon, a motor connected with the winding reel for driving it, reduction gearing arranged between the motor and winding reel, and a friction device connected with the winding reel for placing a constant drag upon its rotation, the winding reel operating to retard the movement of the fish along the track when it is pulled by the first named flexible element.

2. A device to simulate a live fish comprising a track, separate longitudinally spaced electrical contact elements secured to the track and connected with a source of current, a wheeled fish simulating member mounted upon the track for longitudinal movement therealong and including a hollow body portion and horizontally swingable head and tail portions pivotally connected with the body portion, a substantially vertical flat mounting plate secured within the hollow body portion, a motor secured to the mounting plate, a contact shoe electrically connected with the motor and disposed beneath the hollow body portion and adjacent to the track for movement therealong and adapted to engage the separate spaced contact elements, a substantially vertical pulley rotatably mounted upon the mounting plate, gearing connecting the motor and pulley for driving the pulley, the pulley including an eccentric element, a substantially horizontal guide secured to the mounting plate and spaced from the pulley, a longitudinally shiftable block mounted upon the guide, a pitman connected with the block and with the eccentric element of the pulley so that rotation of the pulley will cause reciprocation of the block along the guide, forwardly and rearwardly extending rods pivotally connected with the block and having their free ends disposed near the head and tail portions respectively, and transverse arms secured to the head and tail portions and pivotally connected with the free ends of the rods so that the head and tail portions will swing horizontally when the motor operates.

3. A device to simulate a live fish comprising a relatively stationary track, separate longitudinally spaced contact elements secured to the track and connected with a source of current, a wheeled frame mounted upon the track for longitudinal movement, means connecting the track and frame to prevent the lifting of the frame while permitting it to move longitudinally of the track, a fish simulating member mounted upon the frame and including a central hollow body portion and head and tail portions pivotally connected with the opposite ends of the body portion and adapted to swing horizontally, a substantially vertical flat mounting plate secured to the frame within the hollow body portion, a drive motor mounted upon the mounting plate, a contact shoe secured to the bottom of the frame adjacent to the track and adapted to engage the contact elements of the track as the frame moves along the track and electrically connected with the motor, a vertically disposed pulley journalled upon one side of the mounting plate, gearing connecting the motor and pulley for driving the pulley, the pulley having an eccentric pin, a horizontal longitudinal guide secured to the side of the mounting plate adjacent to the pulley, a block longitudinally slidably mounted upon the guide, a pitman having one end pivotally connected with the block and its opposite end pivotally connected with the eccentric pin of the pulley, forwardly and rearwardly extending substantially horizontal rods pivotally connected with the block and having their free ends terminating adjacent to the head and tail portions respectively, horizontally swingable transverse arms secured to the head and tail portions and pivotally connected with the free ends of the rods, and a flexible element secured to the forward end of the head portion to facilitate pulling the fish simulating member and wheeled frame along the track, the motor operating intermittently when the contact shoe engages the spaced contact elements so that the head and tail portions will intermittently swing horizontally.

MICHAEL DRAGO.

REFERENCES CITED

The following references are of record in the file of this patent:

UNITED STATES PATENTS

| Number | Name | Date |
|---|---|---|
| 726,021 | Bryan | Apr. 21, 1903 |
| 930,613 | Pressly | Aug. 10, 1909 |
| 1,320,581 | Southern | Nov. 4, 1919 |
| 1,620,785 | Roan | Mar. 15, 1927 |
| 1,705,046 | Church | Mar. 12, 1929 |
| 1,758,836 | Holmes | May 13, 1930 |
| 1,798,933 | Edgerton | Mar. 31, 1931 |
| 1,814,779 | Alcala | July 14, 1931 |
| 1,936,713 | Freeman | Nov. 28, 1933 |
| 1,952,658 | Curtiss | Mar. 27, 1934 |
| 2,003,193 | Hirose | May 28, 1935 |
| 2,232,457 | Holland | Feb. 18, 1941 |
| 2,341,234 | O'Byrne | Feb. 8, 1944 |
| 2,460,128 | Greenleaf | Jan. 25, 1949 |

FOREIGN PATENTS

| Number | Country | Date |
|---|---|---|
| 134,740 | Great Britain | Nov. 13, 1919 |